(12) United States Patent
Seita

(10) Patent No.: US 7,630,625 B2
(45) Date of Patent: Dec. 8, 2009

(54) IMAGE PICKUP DEVICE

(75) Inventor: Masato Seita, Saitama (JP)

(73) Assignee: Canon Kabushiki Kaisha (JP)

( * ) Notice: Subject to any disclaimer, the term of this patent is extended or adjusted under 35 U.S.C. 154(b) by 302 days.

(21) Appl. No.: 11/691,536

(22) Filed: Mar. 27, 2007

(65) Prior Publication Data

US 2007/0237516 A1 Oct. 11, 2007

(30) Foreign Application Priority Data

Mar. 28, 2006 (JP) ............................ 2006-089215

(51) Int. Cl.
*G03B 17/18* (2006.01)
(52) U.S. Cl. .............. 396/287; 348/333.06; 348/333.08
(58) Field of Classification Search ................. 396/287; 348/333.01, 333.03, 333.06, 333.08, 333.09
See application file for complete search history.

(56) References Cited

U.S. PATENT DOCUMENTS

2006/0135228 A1* 6/2006 Kato ........................ 455/575.4

2006/0238637 A1* 10/2006 Goto et al. ............. 348/333.06

FOREIGN PATENT DOCUMENTS

JP 2001-275019 A 10/2001

\* cited by examiner

*Primary Examiner*—Rochelle-Ann J Blackman
(74) *Attorney, Agent, or Firm*—Rossi, Kimms & McDowell LLP

(57) ABSTRACT

An image pickup device which makes it possible to perform shooting without moving a device body in response to motion of an object, and also even if an eye gaze direction of a shooter changes in response to the motion of the object, to perform the shooting while turning a display monitor to the eye gaze direction of the shooter. A lens barrel is supported on a device body in a manner rotatable around at least a first axis. A display monitor has a screen section on which a shot image captured by the lens barrel is displayed. A lens barrel drive unit is adapted to rotate the lens barrel around at least the first axis. An interlock unit is adapted to rotate the display monitor around the first axis, in an interlocked manner with the rotation of the lens barrel around the first axis by the lens barrel drive unit.

9 Claims, 13 Drawing Sheets

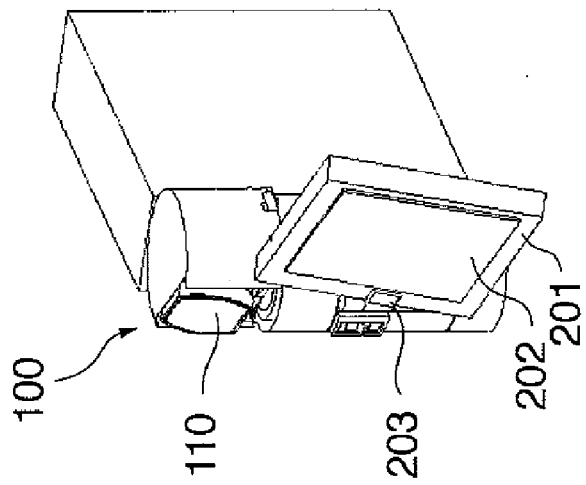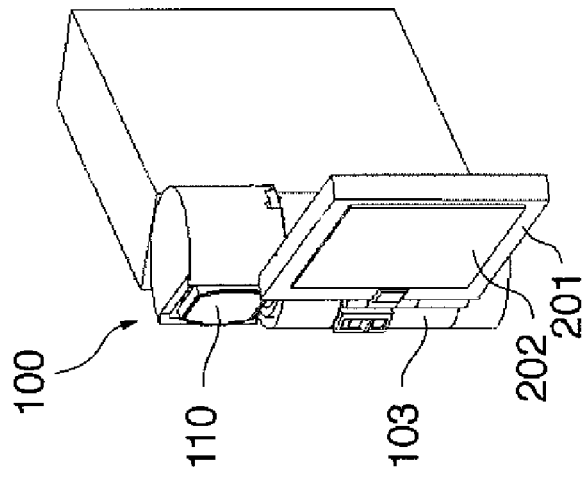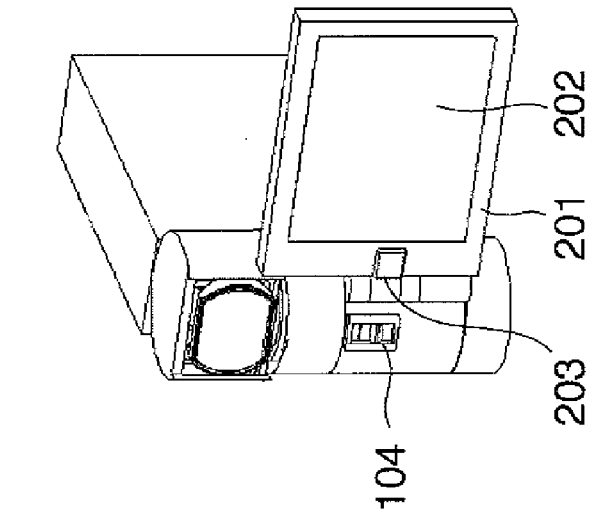

IMAGE PICKUP DEVICE

BACKGROUND OF THE INVENTION

1. Field of the Invention

The present invention relates to an image pickup device provided with a lens barrel and a display monitor.

2. Description of the Related Art

Generally, a video camera is provided with a shooting lens integrally fixed to a camera body, and a viewfinder which enables a shooter to check an object. In addition, such a video camera is often provided with a display monitor so that the object can be easily checked.

This display monitor is configured to be manually rotatable in an arbitrary direction. This enables the shooter to turn the display monitor to a direction in which the shooter can monitor the display monitor while shooting, and to perform the shooting while watching a shot image being displayed on the display monitor. Moreover, turning the display monitor toward the object enables the object himself to check the shot image. In addition, when the display monitor is not used, the display monitor can be closed in a form in which the display monitor forms a side surface of the camera body.

Generally, the object to be shot by the video camera may often be a moving object, and the shooter has to move the video camera in response to motion of the object when the shooter shoots the moving object. However, in the case of performing the shooting while watching the display monitor, the display monitor also moves in response to the move of the video camera, which causes a screen of the display monitor to deviate from the eye gaze of the shooter so that the shooter may not be able to check the shot image, that is, the object on the display monitor. In this case, the shooter has to perform some operations such as manually moving the display monitor so that the shooter can check the object, which, however, may cause the camera body to jiggle.

Therefore, a technique of constantly and automatically turning the display monitor toward the shooter independently of the move of the video camera has been proposed (see Japanese Laid-Open Patent Publication (Kokai) No. 2001-275019, for example). Specifically, this technique is for sensing a rotation angle and a rotational angular speed in response to an operation of moving the video camera by the shooter, and based on the sensed rotation angle and the sensed rotational angular speed, rotationally moving the display monitor in an eye gaze direction of the shooter.

Here, for example, it is assumed that the video camera is fixed on a tripod stand and the like and the shooter himself slightly enters a shooting range of the camera to shoot the shooter as the object. In the case of such a shooting, the display monitor is turned toward the object in order to check the shot image by the shooter himself. Then, the shooter performs the shooting while checking the shot image displayed on the display monitor.

However, the above described conventional technique can rotationally move the display monitor in response to the operation of moving the video camera, however, cannot rotate the display monitor to be turned toward the object in response to the motion of the object (shooter). Hence, when the object moves to a corner of angle of view within the shooting range, the object (shooter) may not be able to easily check the shot image. In other words, the above described conventional technique is not effective in the case where the video camera is fixed and the shooter himself enters the shooting range of the camera to shoot the shooter as the object.

In addition, the above described shooting can be performed by a method of controlling a shooting direction of the video camera by mounting the video camera on a camera platform and remotely operating the camera platform. However, this method requires the operation of the platform and the operation of the video camera respectively, which makes the shooting operation cumbersome.

SUMMARY OF THE INVENTION

The present invention provides an image pickup device which makes it possible to perform shooting without moving a device body in response to motion of an object, and also even if an eye gaze direction of a shooter changes in response to the motion of the object, to perform the shooting while turning a display monitor to the eye gaze direction of the shooter.

In an aspect of the present invention, there is provided an image pickup device comprising: a lens barrel supported on a device body in a manner rotatable around at least a first axis; a display monitor having a screen section on which a shot image captured by the lens barrel is displayed; a lens barrel drive unit adapted to rotate the lens barrel around at least the first axis; and an interlock unit adapted to rotate the display monitor around the first axis, in an interlocked manner with the rotation of the lens barrel around the first axis by the lens barrel drive unit.

According to the present invention, it is possible to perform the shooting without moving the device body in response to the motion of the object, and also even if the eye gaze direction of the shooter changes in response to the motion of the object, to perform the shooting while turning the display monitor to the eye gaze direction of the shooter.

The interlock unit can support the display monitor in a manner in which orientation of the display monitor can be changed so that at least the screen section faces an object, and the interlock unit can rotate the display monitor around the first axis, at the same phase with respect to the rotation of the lens barrel around the first axis by the lens barrel drive unit.

The interlock unit can have a support section adapted to support the display monitor in a manner in which orientation of the display monitor can be changed, and a rotation interlock mechanism adapted to rotate the support section around the first axis in an interlocked manner with the rotation of the lens barrel.

The interlock unit can have a release unit adapted to release the interlock with the rotation of the lens barrel.

The lens barrel is rotatable around a second axis which is orthogonal to the first axis, and the lens barrel drive unit can rotate the lens barrel around the first axis, and also can rotate the lens barrel around the second axis independently of the rotation of the lens barrel around the first axis.

The interlock unit can have a display monitor drive unit adapted to rotate the display monitor around the second axis, and the display monitor drive unit can rotate the display monitor around the second axis in an interlocked manner with the rotation of the lens barrel around the second axis by the lens barrel drive unit.

The image pickup device further can comprise a motion detection unit adapted to detect motion of an object. The lens barrel drive unit can rotate the lens barrel around the first axis, based on a detection result by the motion detection unit.

The image pickup device further can comprise a motion detection unit adapted to detect motion of an object. The lens barrel drive unit can rotate the lens barrel around the first axis and around the second axis, respectively, based on a detection result by the motion detection unit.

The lens barrel can have a bent optical system.

The above and other objects, features, and advantages of the invention will become more apparent from the following detailed description taken in conjunction with the accompanying drawings.

BRIEF DESCRIPTION OF THE DRAWINGS

FIG. 13A is a perspective view showing a state where a tilt hinge section 203 is angularly rotated by Π (rad) to turn the display monitor toward an object, with respect to FIG. 12C, FIG. 13B is a perspective view showing a state where the lens barrel and the display monitor are panning driven in an interlocked manner, with respect to FIG. 13A, and FIG. 13C is a perspective view showing a state where the lens barrel and the display monitor are further tilting driven in an interlocked manner, from the state shown in FIG. 13B.

DETAILED DESCRIPTION OF THE PREFERRED EMBODIMENTS

The present invention will now be described in detail below with reference to the accompanying drawings showing preferred embodiment thereof.

First Embodiment

Figure 1:
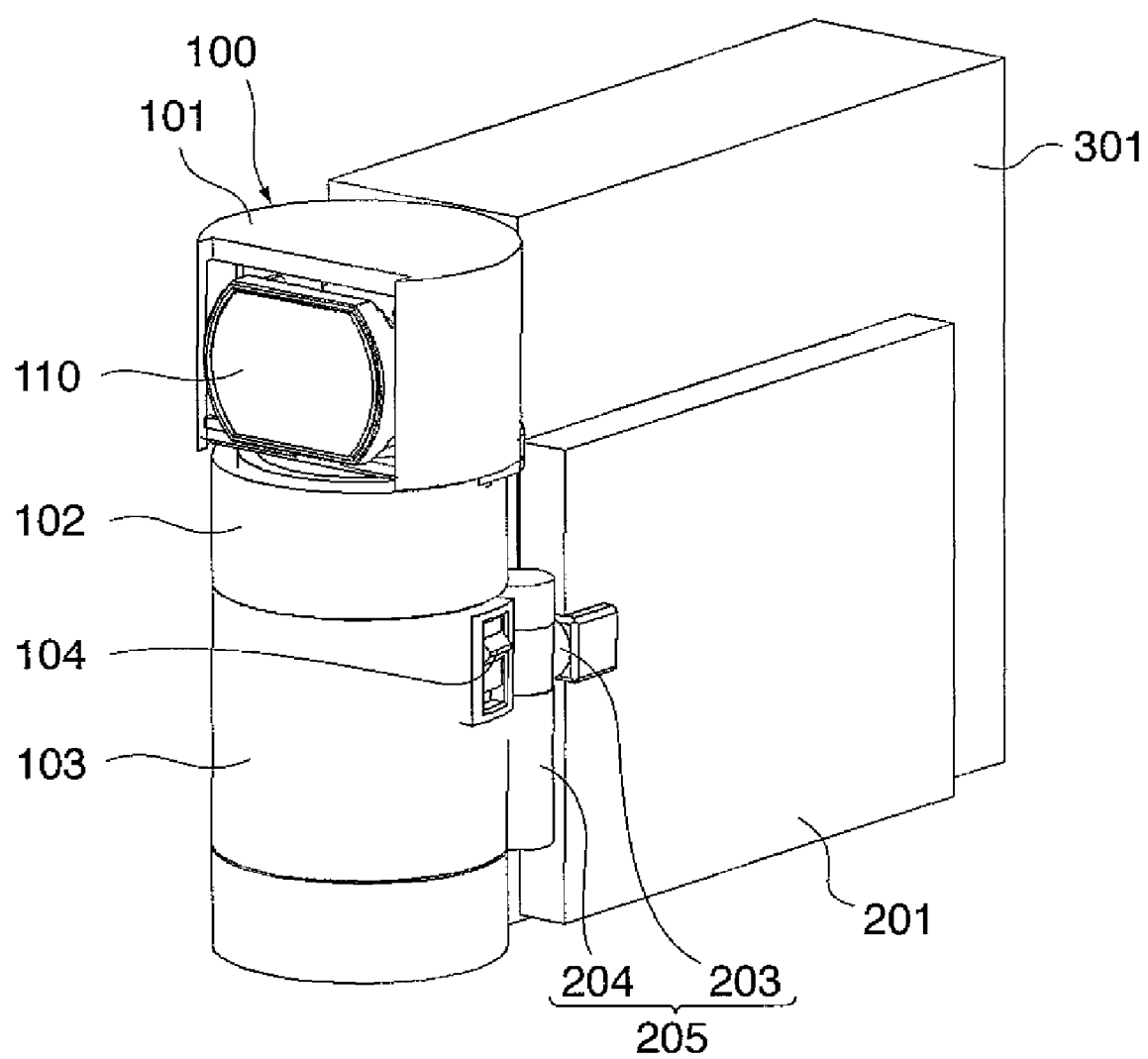
FIG. 1 is an external perspective view of a front side of a video camera as an image pickup device according to a first embodiment of the present invention.

FIG. 1 is an external perspective view of a front side of a video camera as an image pickup device according to a first embodiment of the present invention.

As shown in FIG. 1, the video camera is provided with a camera body 301. On a front surface of the camera body 301, a fixed barrel 102 is attached. The fixed barrel 102 supports a lens barrel 100 in a manner rotatable around an axis of the fixed barrel 102. The lens barrel 100 has a first group lens frame 101, and the first group lens frame 101 holds a first group lens 110 through which a light from an object enters. The light entering through the first group lens 110 from the object is guided downward along an optical path bent by a prism (not shown) included within the first group lens frame 101. Then this light goes through multiple lenses (not shown) to be imaged on an image pickup element (not shown) provided on an under surface side of the lens barrel 100.

The above described lens barrel 100 has a panning drive section (not shown) and a tilting drive section (not shown). The panning drive section rotates the lens barrel 100 around an axis (hereinafter referred to as a "panning axis") of the fixed barrel 102, which enables a pan shooting to be performed in a state where the camera body 301 is static. The tilting drive section rotates a part of an optical system including the first group lens 110 and the above described prism, around an axis extending in a direction orthogonal to the axis of the fixed barrel 102 (hereinafter referred to as a "tilting axis"), which enables a tilt shooting to be performed in the state where the camera body 301 is static.

A display monitor drive barrel 103 extending along the same axis as that of the lens barrel 100 is inserted in the lens barrel 100. The display monitor drive barrel 103 supports a display monitor 201, and also can rotate in an interlocked manner with the rotation of the lens barrel 100 around the panning axis. The display monitor drive barrel 103 is provided with a display monitor interlock switch (display monitor interlock SW) 104. This display monitor interlock SW 104 is a switch which can be operated to slide in a direction of an axis of the display monitor drive barrel 103. The operation of sliding this display monitor interlock SW 104 couples and uncouples the display monitor drive barrel 103 to and from the lens barrel 100. When this display monitor drive barrel 103 is coupled to the lens barrel 100, the display monitor drive barrel 103 is rotated in an interlocked manner with the rotation of the lens barrel 100 around the panning axis. Details of a mechanism of coupling and uncoupling the display monitor drive barrel 103 to and from the lens barrel 100, and a mechanism of rotating the lens barrel 100 and the display monitor drive barrel 103 (display monitor 201) around the panning axis in an interlocked manner will be described later.

The display monitor drive barrel 103 is provided with a hinge section 205 for moving the display monitor 201 to an arbitrary orientation. The hinge section 205 includes a pan hinge section 204 and a tilt hinge section 203. The pan hinge section 204 supports the tilt hinge section 203 in a manner rotatable around an axis which is parallel to the above described panning axis. The tilt hinge section 203 supports the display monitor 201 in a manner rotatable around an axis which is orthogonal to an axis of the pan hinge section 204. Thereby, a shooter can manually rotate the display monitor 201 around the respective axes of the pan hinge section 204 and the tilt hinge section 203 in an independent manner. Hence, the shooter can change orientation of the display monitor 201 to the arbitrary orientation. Moreover, when the display monitor 201 is not used, the shooter can rotate the display monitor 201 to house the display monitor 201 at a housing position so that a screen section of the display monitor 201 is opposed to a side surface of the camera body 301. If the display monitor 201 is housed at the above described housing position, the display monitor 201 is integrated with the side surface of the camera body 301, and also the screen section of the display monitor 201 is not exposed to the outside.

Figure 2:
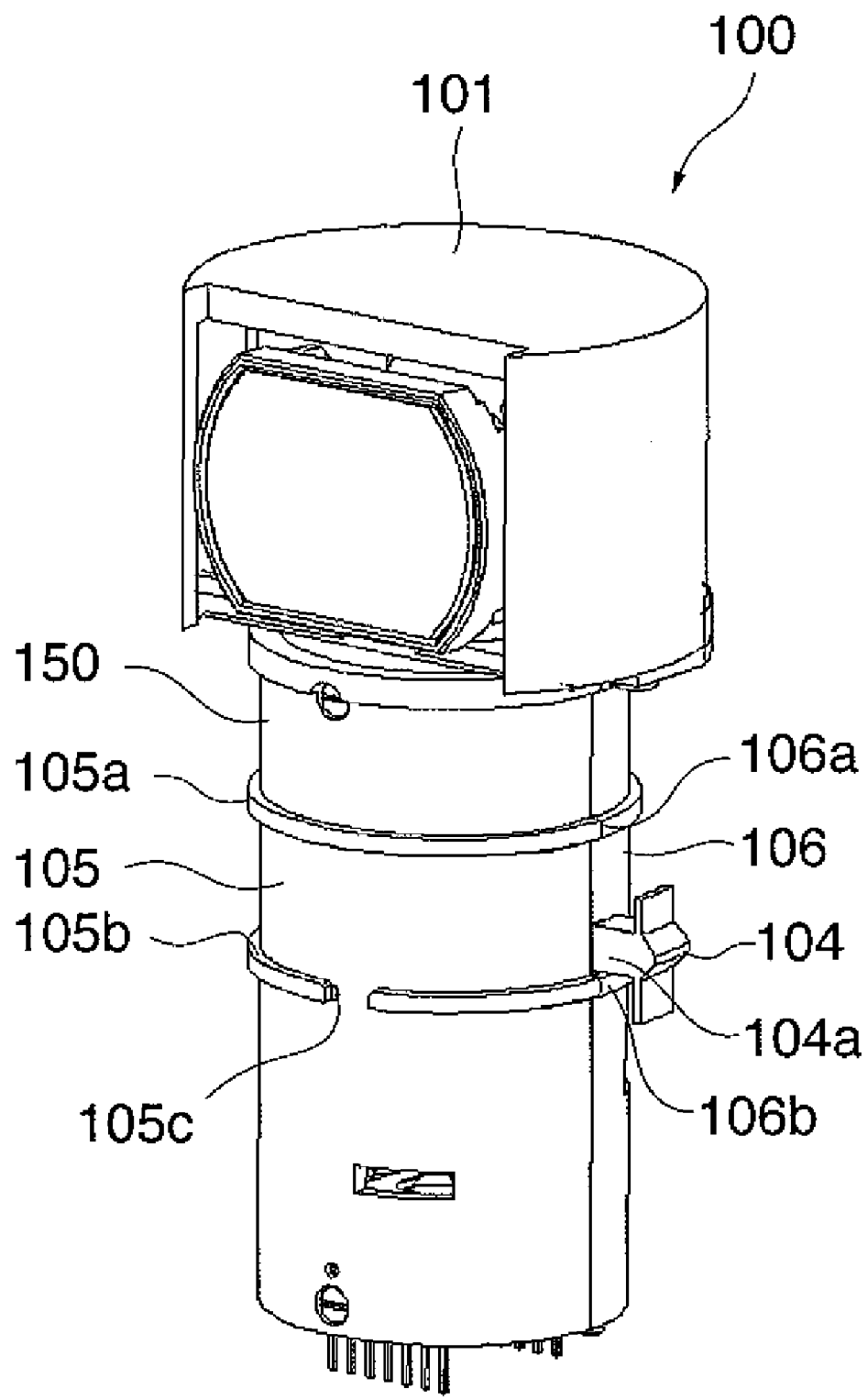
FIG. 2 is a perspective view showing a configuration of a lens barrel in FIG. 1.
Figure 3:
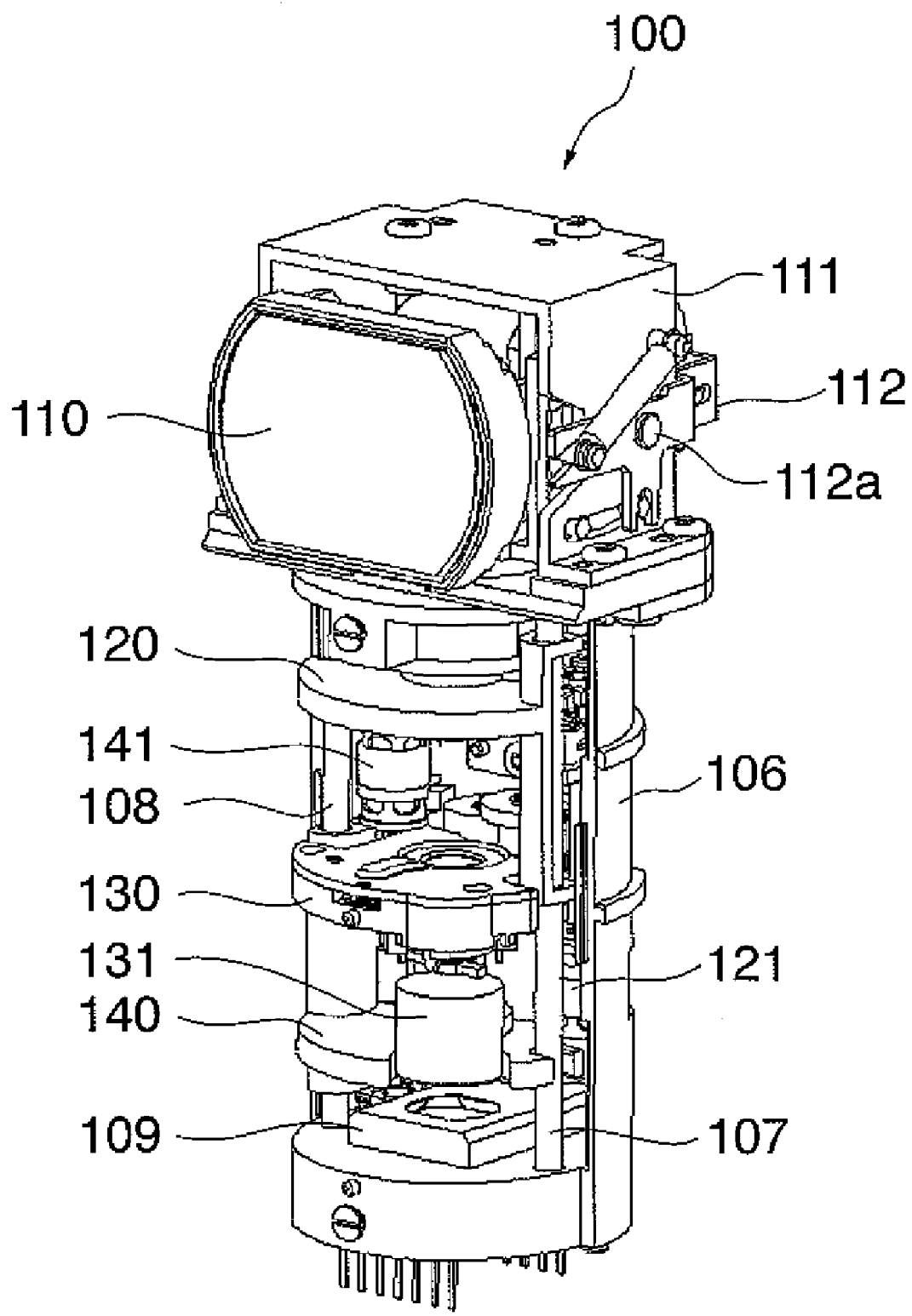
FIG. 3 is a perspective view of the inside of the lens barrel of FIG. 2 shown from its front side.
Figure 4:
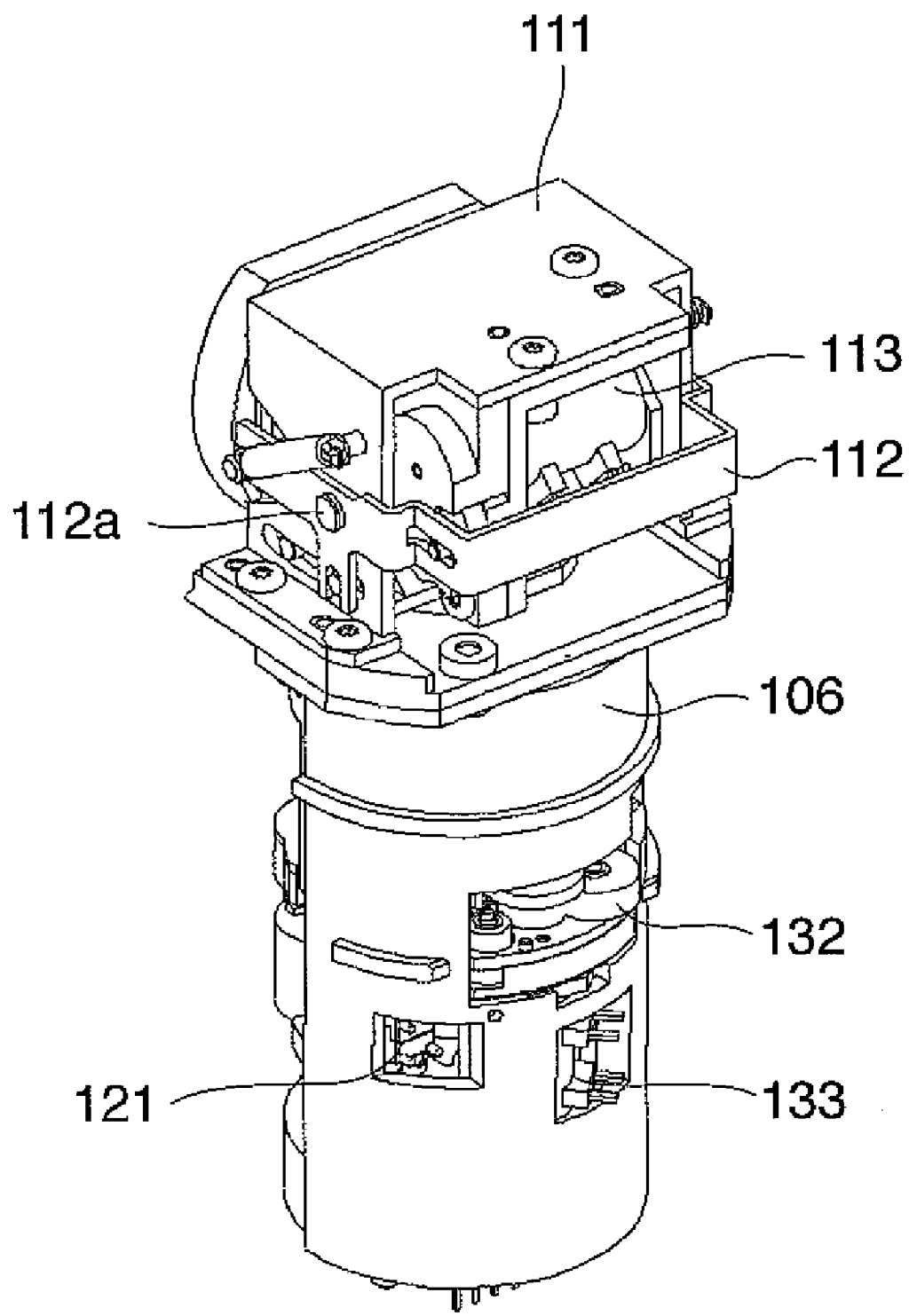
FIG. 4 is a perspective view of the lens barrel of FIG. 2 shown from its back side.
Figure 5:
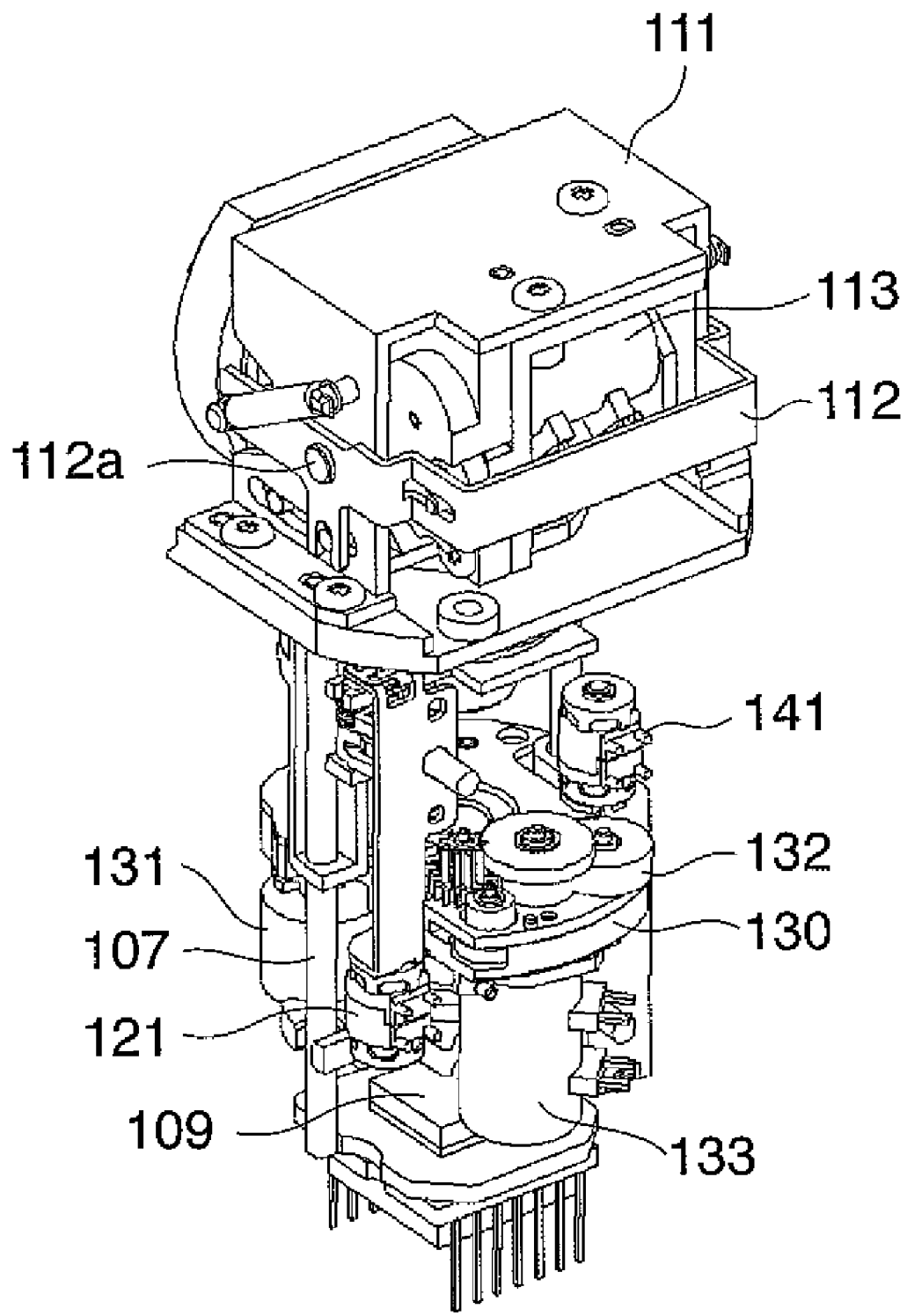
FIG. 5 is a perspective view of the inside of the lens barrel 100 of FIG. 2 shown from its back side.

Next, an internal configuration of the lens barrel 100 will be described with reference to FIGS. 2 to 5. FIG. 2 is a perspective view showing the configuration of the lens barrel 100 of FIG. 1. FIG. 3 is a perspective view of the inside of the lens barrel 100 of FIG. 2 shown from its front side. FIG. 4 is a perspective view of the lens barrel 100 of FIG. 2 shown from its back side. FIG. 5 is a perspective view of the inside of the lens barrel 100 of FIG. 2 shown from its back side.

Within the first group lens frame 101 of the lens barrel 100, the first group lens 110 and a prism frame 111, in which the prism (not shown) forming a bent optical system is fixed, are supported (see FIGS. 2 and 3). At a back side of a reflection surface of the above described prism, a tilting drive motor 113 is arranged (see FIG. 4). A driving force of this tilting drive motor 113 is transmitted via a speed reduction gear section (not shown) to a tilting drive lever 112. The tilting drive lever 112 is angularly rotated around a shaft 112a by the above described driving force (see FIGS. 3 to 5). In an interlocked manner with the rotation of this tilting drive lever 112, the first group lens 110 and the above described prism are rotated at a predetermined angle around the above described tilting axis. In this way, the tilting drive motor 113, the tilting drive lever 112 and the like as described above configure the above described tilting drive section.

The lens barrel 100 has a lens barrel outer frame 150 for housing optical systems of a second group lens or later arranged at downstream of the prism of the first group lens frame 101 (see FIG. 2). The lens barrel outer frame 150 is configured with a lens barrel front frame 105 and a lens barrel back frame 106, which are joined with each other. Specifically, within this lens barrel outer frame 150, a second group lens frame 120, a fourth group lens frame 140, a third group lens frame 130 and an image pickup element 109 are housed (see FIG. 3).

The second group lens frame 120 and the fourth group lens frame 140 are fitted in two guide bars 107 and 108, respectively. The second group lens frame 120 and the fourth group lens frame 140 are moved along the respective guide bars 107 and 108 by drive motors 121 and 141, respectively.

The third group lens frame 130 is fixed to the above described lens barrel outer frame 150. An aperture device (not shown) is held in the third group lens frame 130, and an aperture drive motor 131 is fixed at a surface of the third group lens frame 130 facing the image pickup element 109. In addition, a panning drive motor 133, and a panning drive gear group 132 to which a driving force of the panning drive motor 133 is transmitted, are fixed to the third group lens frame 130 (see FIGS. 4 and 5). A final gear of the panning drive gear group 132 is engaged with an internal gear section (not shown) provided in the camera body 301. Thereby, rotation of the panning drive motor 133 rotates the entire lens barrel 100 including the tilting drive section, around the above described panning axis, while the entire lens barrel 100 is supported by the fixed barrel 102. Such elements as the panning drive motor 133, the panning drive gear group 132, the above described internal gear section and the like configure the above described panning drive section.

Next, a mechanism of interlocking a panning operation of the lens barrel 100 and a panning operation of the display monitor 201 will be described.

As shown in FIG. 2, on an outer peripheral surface of the lens barrel front frame 105 of the lens barrel 100, a panning drive guide 105a and a display monitor drive barrel guide 105b are provided which extend in a circumferential direction. Moreover, on an outer peripheral surface of the lens barrel back frame 106, a panning drive guide 106a and a display monitor drive barrel guide 106b are provided which extend in the circumferential direction.

Each of the panning drive guides 105a and 106a has a rectangular cross sectional form, and both guides are arranged so that corresponding ends of both guides are integrally continued. The respective panning drive guides 105a and 106a are fit in guide slots (not shown) formed on an inner peripheral surface of the fixed barrel 102.

Each of the display monitor drive barrel guides 105b and 106b has a rectangular cross sectional form, and both guides are arranged so that ends of both guides are integrally continued. Here, at a portion in the middle of the display monitor drive barrel guide 105b, a notch 105c is formed which can be engaged with an engaging section 104a of the display monitor interlock SW 104. The respective display monitor drive barrel guides 105b and 106b are fit in guide slots (not shown) formed on an inner peripheral surface of the display monitor drive barrel 103.

According to the operation of sliding the above described display monitor interlock SW 104, the above described notch 105c and the engaging section 104a of the display monitor interlock SW 104 are engaged or the engagement between them is released. Specifically, in a state where the display monitor interlock SW 104 has been slid upward, the engagement between the engaging section 104a of the display monitor interlock SW 104 and the above described notch 105c has been released. In other words, the display monitor drive barrel 103 has been uncoupled from the lens barrel 100. On the other hand, when the display monitor interlock SW 104 is slid downward, the engaging section 104a of the display monitor interlock SW 104 is engaged with the above described notch 105c. In other words, the display monitor drive barrel 103 is coupled to the lens barrel 100.

When the lens barrel 100 is panning driven (when the lens barrel 100 is driven to rotate around an axis line of the fixed barrel 102), the panning drive motor 133 is driven. Thereby, the lens barrel 100 is rotated in a panning direction, while the panning drive guides 105a and 106a are guided by the above described guide slots of the fixed barrel 102. At this point, if the display monitor interlock SW 104 has been slid upward and the engagement between the display monitor drive barrel 103 and the lens barrel 100 has been released, the display monitor drive barrel 103 is held in a static state without being interlocked with the rotation of the lens barrel 100. In other words, the display monitor 201 is not interlocked with the rotation of the lens barrel 100 and is held in the static state at its current position.

On the other hand, in the case of driving the lens barrel 100 and the display monitor 201 in the panning direction in an interlocked manner, first, the shooter angularly rotates the display monitor drive barrel 103 from its initial position by Π/2 (rad) in the panning direction with respect to the lens barrel 100. Here, its initial position is a position at which the display monitor 201 can be housed. Then, the display monitor drive barrel 103 angularly rotated from its initial position by π/2 (rad) in the panning direction is held at a position at which the engaging section 104a of the display monitor interlock SW 104 and the above described notch 105c can be engaged. At this position, when the display monitor interlock SW 104 is slid downward, the engaging section 104a of the display monitor interlock SW 104 and the above described notch 105c are engaged. In other words, the display monitor drive barrel 103 is coupled to the lens barrel 100.

In a state where the display monitor drive barrel 103 is coupled to the lens barrel 100, if the panning drive motor 133 rotates the lens barrel 100 around the above described panning axis, the display monitor drive barrel 103 is interlocked with the rotation of the lens barrel 100 and rotated around the above described panning axis at the same phase. In other words, the panning operation of the display monitor 201 can be performed in an interlocked manner with the panning operation of the lens barrel 100.

Figure 6A:
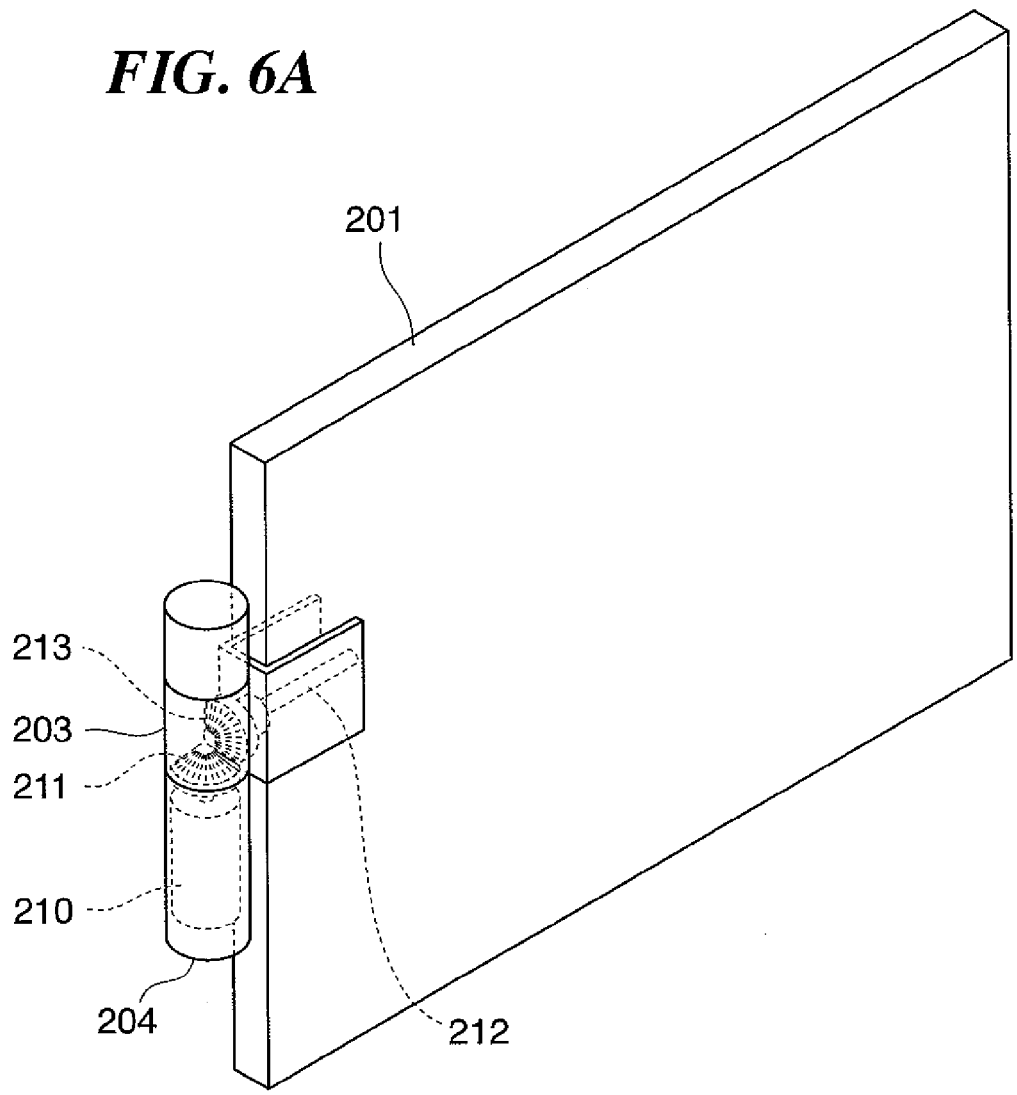
FIG. 6A is a perspective view showing a configuration of essential parts of a hinge section in FIG. 1.

Next, a mechanism of interlocking a tilting operation of the lens barrel 100 and a tilting operation of the display monitor 201 will be described with reference to FIGS. 6A and 6B. FIG. 6A is a perspective view showing a configuration of essential parts of the hinge section of FIG. 1, and FIG. 6B is a perspective view of bevel gears in the configuration of the essential parts of the hinge of FIG. 6A.

The tilting drive motor 113 of the tilting drive section of the lens barrel 100 is a stepping motor, and when a predetermined number of drive pulses are given with respect to the tilting drive motor 113, the first group lens 110 and the above described prism are rotated at a predetermined angle in a tilting direction.

Figure 6B:
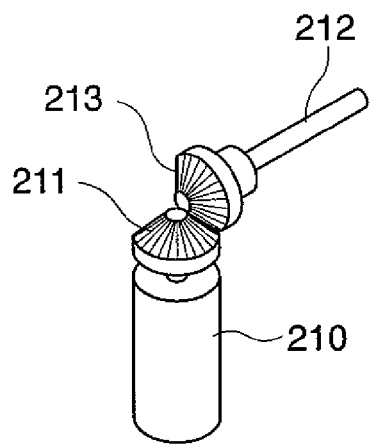
FIG. 6B is a perspective view of bevel gears in the configuration of the essential parts of the hinge of FIG. 6A.

On the other hand, as shown in FIGS. 6A and 6B, the pan hinge section 204 of the above described hinge section 205 includes a tilt hinge section drive motor 210 consisting of a stepping motor, and the tilt hinge section drive motor 210 is provided with a speed reduction unit. The tilt hinge section drive motor 210 is arranged so that its output shaft becomes the same shaft as a rotating shaft of the pan hinge section 204. A bevel gear 211 is attached at the output shaft of the tilt hinge section drive motor 210. At the tilt hinge section 203, a rotating shaft 212 is provided which is orthogonal to the rotating shaft of the pan hinge section 204. The rotating shaft 212 supports the display monitor 201, and a bevel gear 213 engaged with the bevel gear 211 is attached at one end of the rotating shaft 212.

Driving this tilt hinge section drive motor 210 in an interlocked manner with driving of the tilting drive motor 113 of the tilting drive section of the lens barrel 100 can interlock a tilting operation of the first group lens 110 and the tilting operation of the display monitor 201. Specifically, when the predetermined number of drive pulses are given with respect to the tilting drive motor 113 of the lens barrel 100, the first group lens 110 and the above described prism are rotated at the predetermined angle in the tilting direction. At this point, according to the drive pulses of the tilting drive motor 113, the drive pulses are given with respect to the above described tilt hinge section drive motor 210. Thereby, the tilting operation of the display monitor 201 is performed in an interlocked manner with the tilting operation of the first group lens 110.

Here, the tilting operation of the display monitor 201 is performed around the shaft 212 of the tilt hinge section 203, and the tilting operation of the first group lens 110 is performed around the above described tilting axis. Hence, in order to perform the tilting operation of the display monitor 201 around an axis which is orthogonal to the above described panning axis and parallel to the above described tilting axis, it is necessary to couple the display monitor drive barrel 103 to the lens barrel 100 by the display monitor interlock SW 104.

Figure 7:
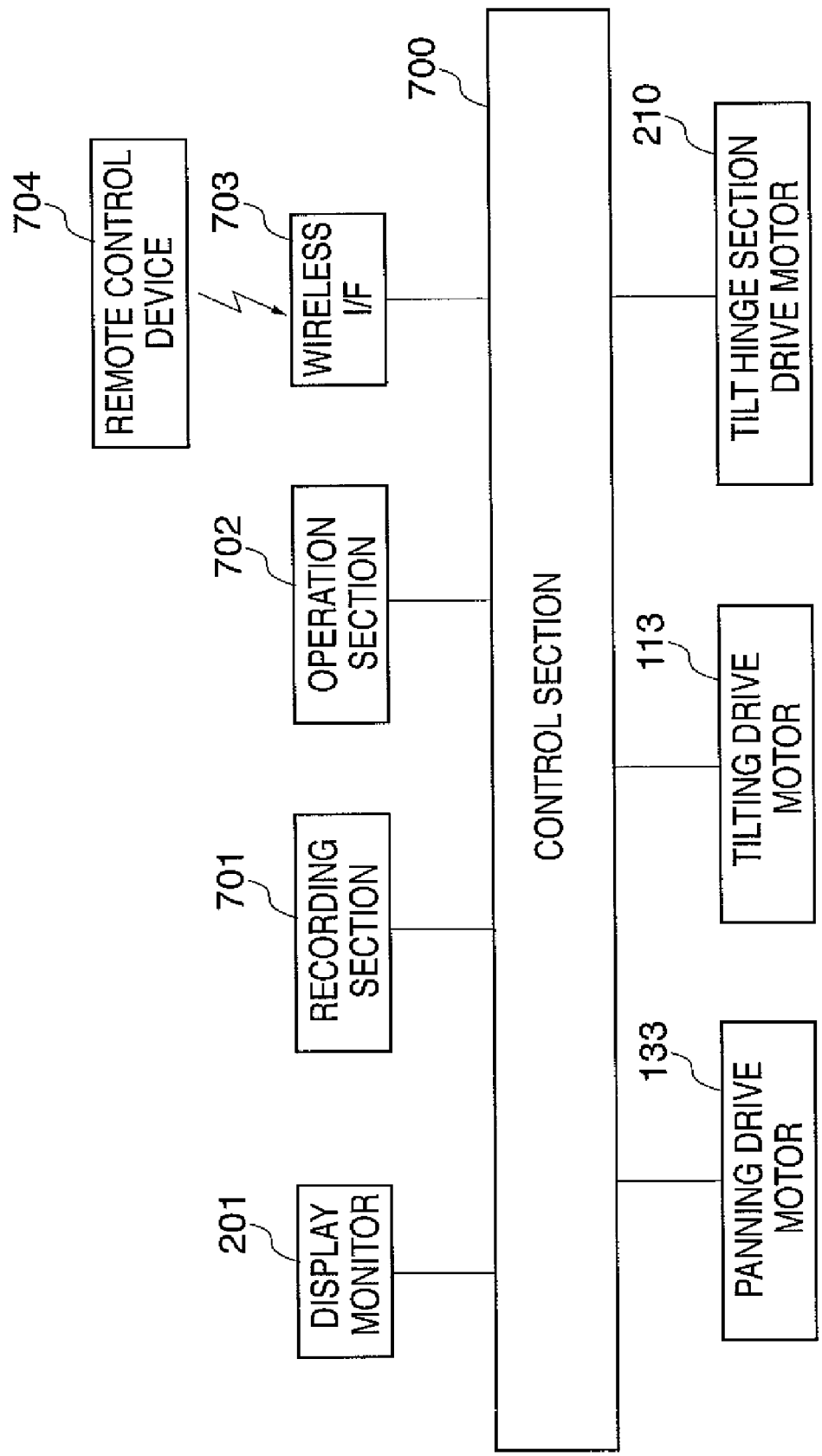
FIG. 7 is a block diagram showing a configuration of a control system of the video camera of FIG. 1.

Next, a control system in the video camera of this embodiment will be described with reference to FIG. 7. FIG. 7 is a block diagram showing a configuration of the control system of the video camera of FIG. 1.

As shown in FIG. 7, this video camera is provided with a control section 700. The control section 700 has a CPU, a memory, an I/O interface and the like. The control section 700 performs various controls based on operation instructions inputted from an operation section 702 or a remote control device 704. For example, the control section 700 controls a recording section 701 to record a shot image in a recording medium (for example, a memory card and the like). Moreover, the control section 700 performs display controls such as displaying the shot image on the display monitor 201 and displaying an operation menu screen for selecting a desired shooting mode from among multiple shooting modes. The shooter operates the operation section 702 or the remote control device 704 according to the above described operation menu screen to input for selecting the shooting mode. When the shooter selects the shooting mode, the control section 700 controls to drive the respective motors including the panning drive motor 133, the tilting drive motor 113 and the tilt hinge section drive motor 210, depending on the selected shooting mode. Although only the panning drive motor 133, the tilting drive motor 113 and the tilt hinge section drive motor 210 are shown herein, the control section 700 actually controls drive motors other than the above described motors.

The operation section 702 may have various hard keys for inputting numeric values, moving a cursor and the like, or may be incorporated in the display monitor 201 to display depressible and operable soft keys on the display monitor 201. In addition, the instructions inputted by operating the remote control device 704 are sent to a wireless interface (wireless I/F) 703 in a wireless manner, and the instructions received by the wireless I/F 703 are inputted to the control section 700.

The shooting modes selectable by the shooter include an object tracking mode, a reciprocating operation mode and a remote control mode. The object tracking mode is a useful mode in the case where the video camera is fixed on a tripod stand and the like. In the case of this object tracking mode, an object regarded as a target is recognized by an object recognition process from among images captured by the lens barrel 110, and the panning and tilting operations of the lens barrel 100 are controlled to track the recognized object. In other words, driving of the respective motors, that is, the tilting drive motor 113, the tilt hinge section drive motor 210 and the panning drive motor 133, is controlled. Moreover, in the case of this object tracking mode, the panning operation of the display monitor 201 can be performed in an interlocked manner with the panning operation of the lens barrel 100. Also, the tilting operation of the display monitor 201 can be performed in an interlocked manner with the tilting operation of the lens barrel 100.

The reciprocating operation mode is a mode which is particularly useful in the case where this video camera is mounted on the tripod stand and the like to be used as a monitoring camera. In this reciprocating operation mode, an angular range and an operation speed for a reciprocating operation while the panning or tilting operation is performed are specified, and the panning or tilting operation of the lens barrel 100 is performed in the specified angular range, at the specified operation speed. Also in the case of this mode, the panning or tilting operation of the display monitor 201 can be performed in an interlocked manner with the panning or tilting operation of the lens barrel 100.

The remote control mode is a mode of performing the panning operation or the tilting drive of the lens barrel 100 according to the remote control operation. Also in the case of this mode, the panning or tilting operation of the display monitor 201 can be performed in an interlocked manner with the panning or tilting operation of the lens barrel 100.

Next, with reference to FIGS. 8 to 11, a procedure will be described from the operation of selecting the shooting mode until setting the selected shooting mode, which is executed by the control section 700 (CPU) of the video camera in FIG. 7.

Figure 8:
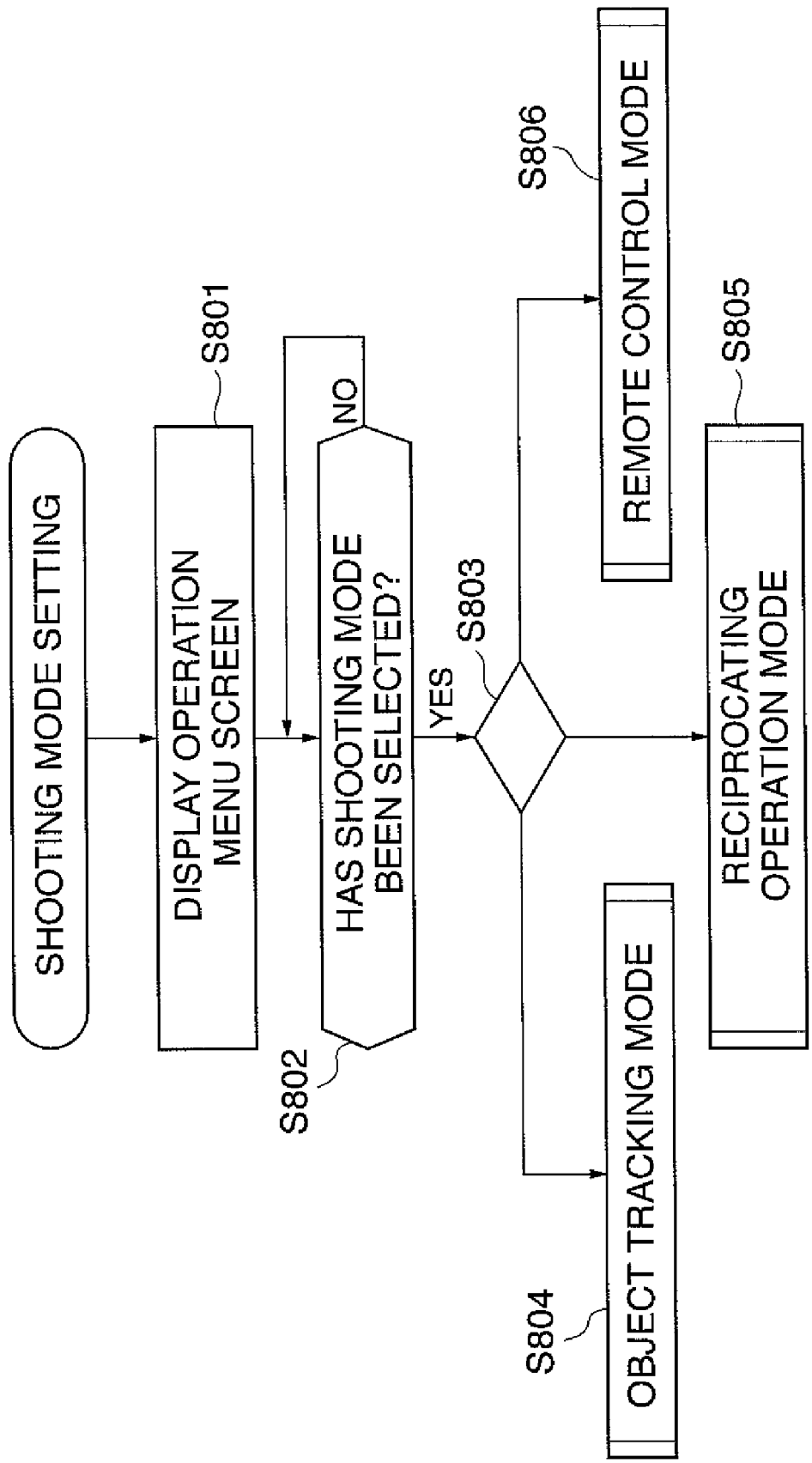
FIG. 8 is a flowchart showing a procedure of an operation of selecting a shooting mode executed by the control system of the video camera of FIG. 7.
Figure 9:
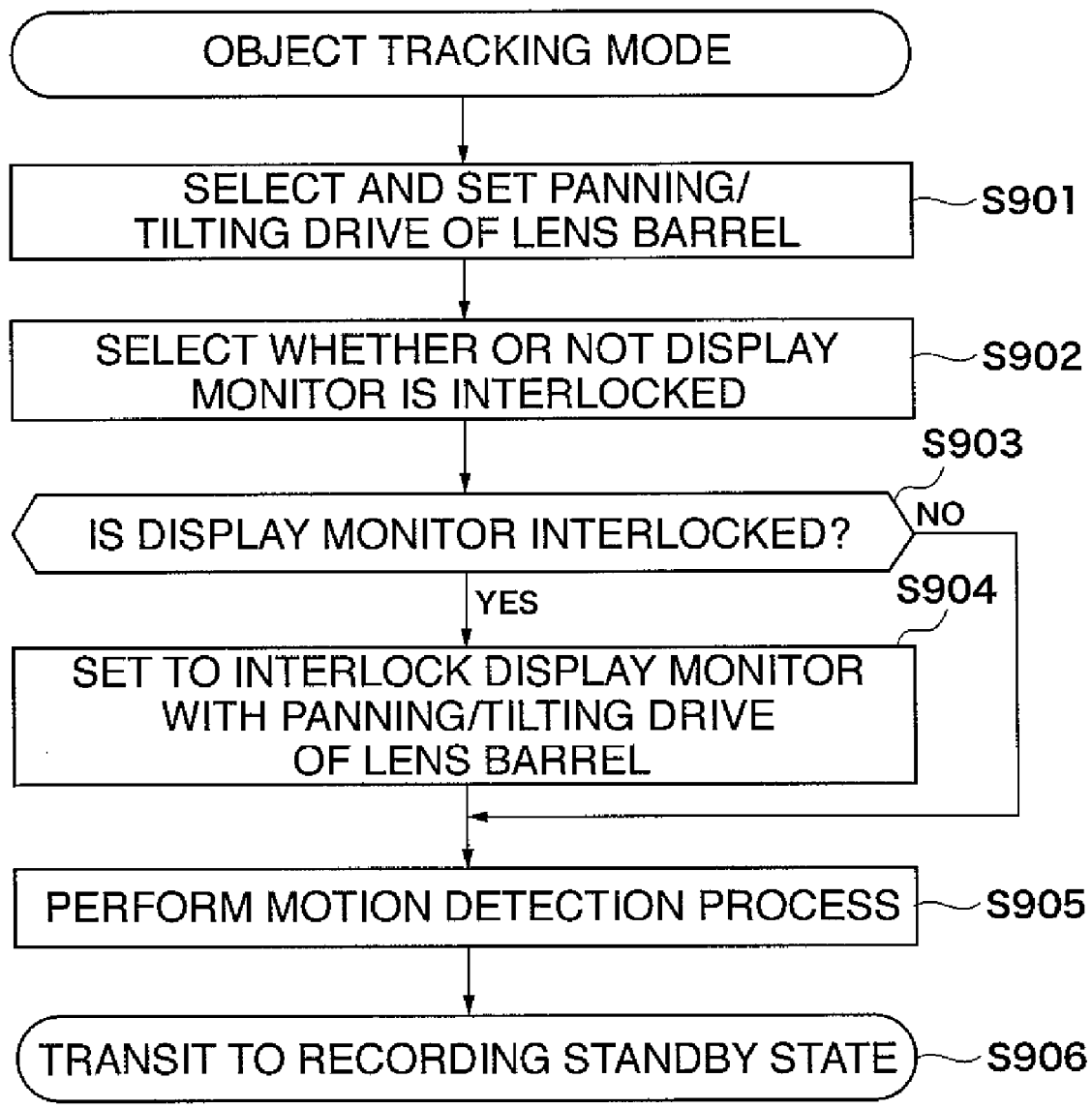
FIG. 9 is a flowchart showing a procedure of setting an object tracking mode executed by the control system of the video camera of FIG. 7.
Figure 10:
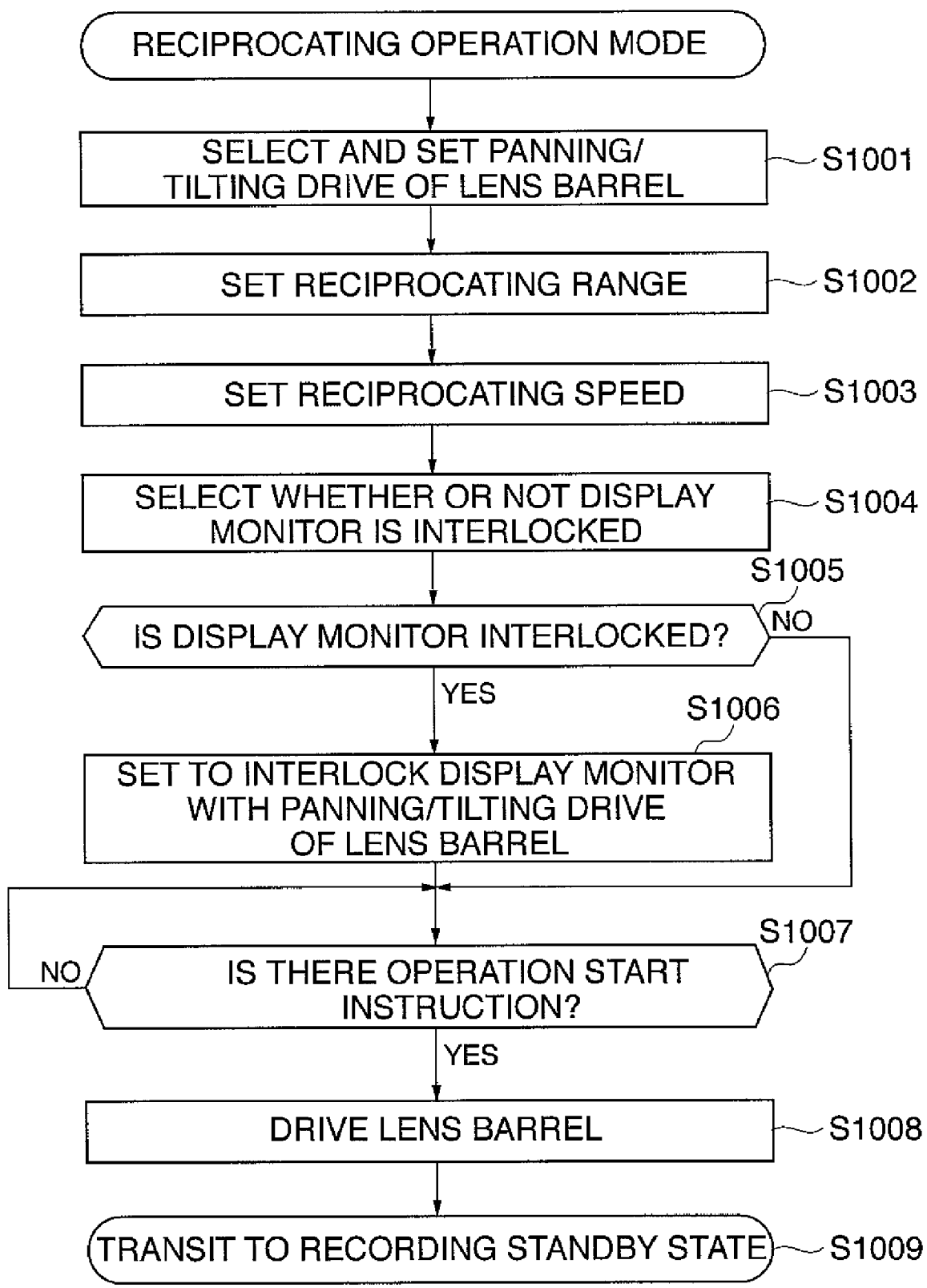
FIG. 10 is a flowchart showing a procedure of setting a reciprocating operation mode executed by the control system of the video camera of FIG. 7.
Figure 11:
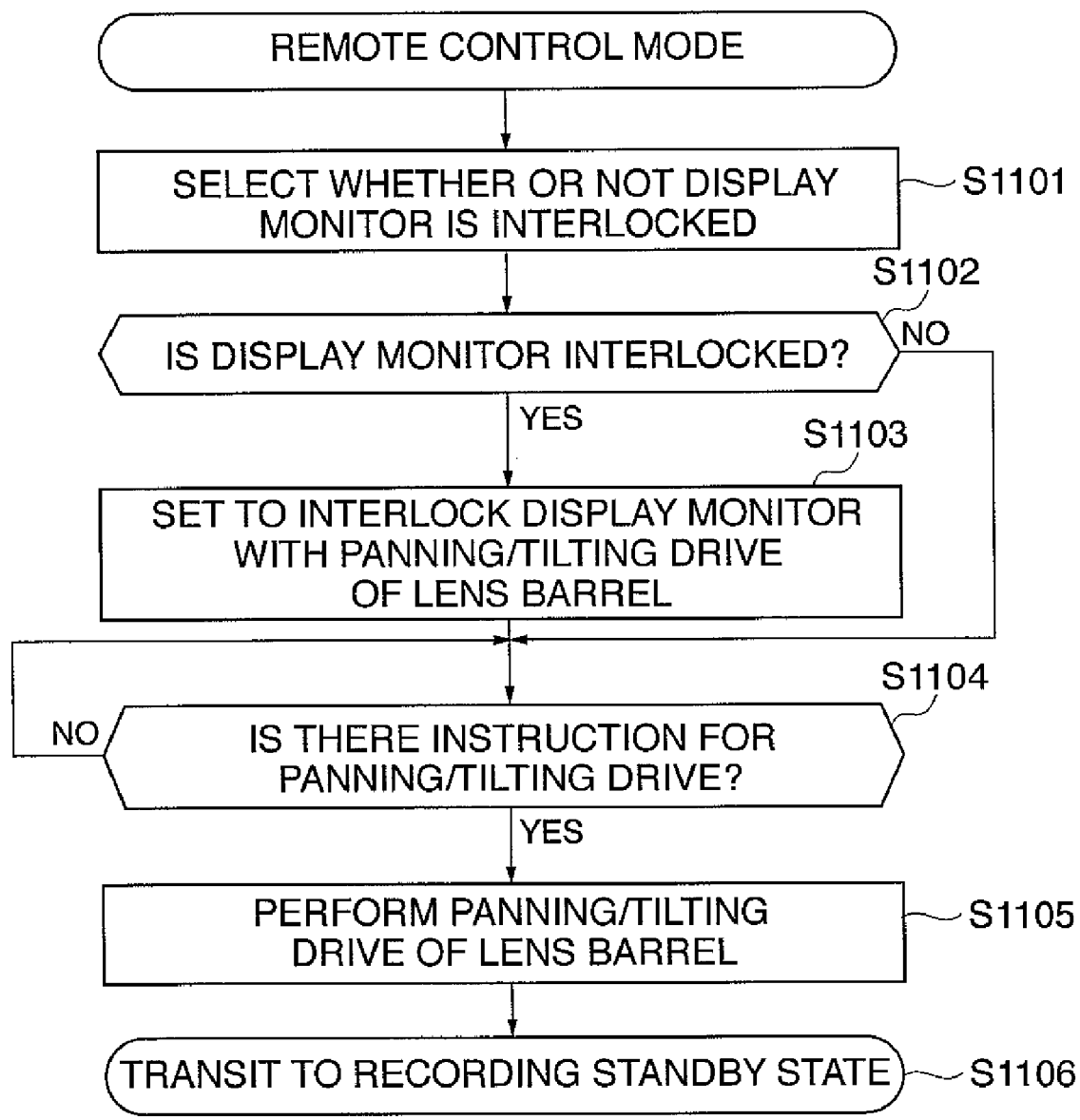
FIG. 11 is a flowchart showing a procedure of setting a remote control mode executed by the control system of the video camera of FIG. 7.

FIG. 8 is a flowchart showing a procedure of the operation of selecting the shooting mode. FIG. 9 is a flowchart showing a procedure of setting the object tracking mode. FIG. 10 is a flowchart showing a procedure of setting the reciprocating operation mode. FIG. 11 is a flowchart showing a procedure of setting the remote control mode.

In the case of selecting the shooting mode, as shown in FIG. 8, the control section 700 displays the operation menu screen for selecting the shooting mode on the display monitor 201 (step S801). On this operation menu screen, icons associated with the respective modes, that is, the object tracking mode, the reciprocating operation mode and the remote control mode, are displayed. Next, the control section 700 waits for the input from the operation section 702 (step S802). Here, the input from the operation section 702 is an input for selecting one of the respective icons, which is obtained by operating the operation section 702 by the shooter. Then, the control section 700 determines whether or not the shooting mode selected based on the icon selected with the above described input is the object tracking mode, the reciprocating operation mode or the remote control mode (step S803).

Here, if it is determined that the above described selected shooting mode is the object tracking mode, the control section 700 performs the setting of the object tracking mode of FIG. 9 as described below (step S804). If it is determined that the selected shooting mode is the reciprocating operation mode, the control section 700 performs the setting of the reciprocating operation mode of FIG. 10 as described below (step S805). If it is determined that the selected shooting mode is the remote control mode, the control section 700 performs the setting of the remote control mode of FIG. 11 as described below (step S806).

If the setting of the object tracking mode is performed at step S804 of FIG. 8, as shown in FIG. 9, the control section 700 performs setting of the panning and tilting operations of the lens barrel 100 based on the input from the operation section 702 by the shooter (step S901). Here, on the above described operation menu screen, icons are displayed for setting ON/OFF of each of the panning operation and the tilting operation of the lens barrel 100. Then, based on selection of the above described icons, the control section 700 sets to perform both or any one of the panning operation and the tilting operation of the lens barrel 100.

Next, the control section 700 displays an icon for selecting whether or not the display monitor 201 is interlocked with both or any one of the panning operation and the tilting operation of the lens barrel 100, on the above described operation menu screen (step S902). Here, the icon is displayed for selecting whether the display monitor 201 is interlocked with both or any one of the panning operation and the tilting operation of the lens barrel 100, or the display monitor 201 is not interlocked with any of them. Then, the shooter selects the corresponding icon.

Next, based on the above described selected icon, the control section 700 determines whether or not the display monitor 201 is interlocked (step S903). Here, if it is determined that the display monitor 201 is interlocked, the control section 700 sets to interlock the display monitor 201 with both or any one of the panning operation and the tilting operation of the lens barrel 100, based on the above described selected icon (step S904).

Here, in order to interlock the panning operation of the lens barrel 100 and the panning operation of the display monitor 201, the operation of sliding the display monitor interlock SW 104 by the shooter is required, as described above. In other words, the setting for interlocking the panning operation of the lens barrel 100 and the panning operation of the display monitor 201 has actually no relation to the setting for the control, and just causes the shooter to check whether the shooter has performed the operation of sliding the display monitor interlock SW 104. On the other hand, the setting for interlocking the tilting operation of the lens barrel 100 and the tilting operation of the display monitor 201 is the setting required for controlling to drive the tilt hinge section drive motor 210 in synchronization with the tilting drive motor 113, as described above.

Next, the control section 700 performs a motion detection process with respect to the object, in order to track the object by the lens barrel 100 (step S905). In this motion detection process, first, the object regarded as the target is captured by the lens barrel 100. Then, a motion vector of this object is detected, and based on a result of detecting the motion vector of the object, a panning drive amount or a tilting drive amount of the lens barrel 100 for holding the object at a center position on the screen is calculated. Next, based on these calculated drive amounts, the panning drive motor 133 or the tilting drive motor 113 is driven.

Here, for example, if both of the panning operation and the tilting operation of the lens barrel 100 have been set to be performed, the lens barrel 100 tracks the object while performing. the panning operation and the tilting operation. If any one of the panning operation and the tilting operation of the lens barrel 100 has been set to be performed, the object is tracked by any one of the panning operation and the tilting operation of the lens barrel 100. Moreover, in any case, if the display monitor 201 has been set to be interlocked, the panning operation or the tilting operation of the display monitor 201 is performed in an interlocked manner with both or any one of the panning operation and the tilting operation of the lens barrel 100.

If it is determined that the display monitor 201 is not interlocked at the above described step S903, the control section 700 skips the above described step S904 to proceed to the above described step S905.

In this way, when the object tracking mode has been completely set, the control section 700 transits to a recording standby state in which recording can be started in response to a recording start instruction (step S906).

If the setting of the reciprocating operation mode is performed at step S805 of FIG. 8, as shown in FIG. 10, the control section 700 performs the setting of the panning and tilting operations of the lens barrel 100 based on the input from the operation section 702 by the shooter (step S1001). Here, on the above described operation menu screen, the icons are displayed for setting ON/OFF of each of the panning drive and the tilting drive of the lens barrel 100. Then, based on the selection of the above described icons, the control section 700 sets to perform both or any one of the panning drive and the tilting drive of the lens barrel 100.

Next, the control section 700 displays input fields for inputting values indicating a reciprocating range on the above described operation menu screen, and sets the reciprocating range based on the values inputted in the input fields (step S1002). Here, if the panning drive has been set to be performed with respect to the lens barrel 100, an angle for defining a starting point and an angle for defining an ending point with respect to a panning drive range of the lens barrel 100 are inputted. Moreover, if the tilting drive has been set to be performed with respect to the lens barrel 100, an angle for defining a starting point and an angle for defining an ending point with respect to a tilting drive range of the lens barrel 100 are inputted.

Next, the control section 700 displays an input field for inputting a value indicating a reciprocating speed in the above described set reciprocating range, on the above described operation menu screen, and sets the reciprocating speed based on the value inputted in the input field (step S1003). Here, if the panning drive has been set to be performed with respect to the lens barrel 100, a panning drive speed of the lens barrel 100 is inputted. Moreover, if the tilting drive has been set to be performed with respect to the lens barrel 100, a tilting drive speed of the lens barrel 100 is inputted.

Next, the control section 700 displays the icon for selecting whether or not the display monitor 201 is interlocked with both or any one of the panning drive and the tilting drive of the lens barrel 100, on the above described operation menu screen (step S1004). Here, the icon is displayed for selecting whether the display monitor 201 is interlocked with both or any one of the panning drive and the tilting drive of the lens barrel 100, or the display monitor 201 is not interlocked with any of them. Then, the shooter selects the corresponding icon.

Next, based on the above described selected icon, the control section 700 determines whether or not the display monitor 201 is interlocked (step S1005). Here, if it is determined that the display monitor 201 is interlocked, the control section 700 sets to interlock the display monitor 201 with both or any one of the panning operation and the tilting operation of the lens barrel 100, based on the selected icon (step S1006). Here, in order to interlock the panning operation of the lens barrel 100 and the panning operation of the display monitor 201, the operation of sliding the display monitor interlock SW 104 by the shooter is required, as described above.

Next, the control section 700 waits for an operation start instruction to be inputted from the operation section 702 (YES in step S1007). Here, when the operation start instruction is inputted, the control section 700 performs both or any one of the panning operation and the tilting operation of the lens barrel 100, with respect to the set reciprocating range, at the set speed (step S1008). In other words, both or any one of the panning drive motor 133 and the tilting drive motor 113 is driven with a corresponding control amount.

If it is determined that the display monitor 201 is not interlocked at the above described step S1005, the control section 700 skips the above described step S1006 to proceed to the above described step S1007.

In this way, when the reciprocating operation mode has been completely set, the control section 700 transits to the recording standby state in which the recording can be started in response to the recording start instruction (step S1009).

If the setting of the remote control mode is performed at step S806 of FIG. 8, as shown in FIG. 11, the control section 700 displays the icon for selecting whether or not the display monitor 201 is interlocked with both or any one of the panning operation and the tilting operation of the lens barrel 100, on the above described operation menu screen (step S1101). Here, the icon is displayed for selecting whether the display monitor 201 is interlocked with both or any one of the panning operation and the tilting operation of the lens barrel 100, or the display monitor 201 is not interlocked with any of them. Then, the shooter selects the corresponding icon.

Next, based on the above described selected icon, the control section 700 determines whether or not the display monitor 201 is interlocked (step S1102). Here, if it is determined that the display monitor 201 is interlocked, the control section 700 sets to interlock the display monitor 201 with both or any one of the panning operation and the tilting operation of the lens barrel 100, based on the selected icon (step S1103). Here, in order to interlock the panning operation of the lens barrel 100 and the panning operation of the display monitor 201, the operation of sliding the display monitor interlock SW 104 by the shooter is required, as described above.

Next, the control section 700 waits for an instruction for at least one of the panning operation and the tilting operation, to be inputted from the remote control device 704 (step S1104). Here, when the above described instruction is inputted from the remote control 704, the control section 700 drives the panning drive motor 133 or the tilting drive motor 113 to perform the panning operation or the tilting operation of the lens barrel 100 based on the inputted instruction (step S1105).

If it is determined that the display monitor 201 is not interlocked at the above described step S1102, the control section 700 skips the above described step S1103 to proceed to the above described step S1104.

In this way, when the remote control mode has been completely set, the control section 700 transits to the recording standby state in which the recording can be started in response to the recording start instruction (step S1106).

Figure 12A:
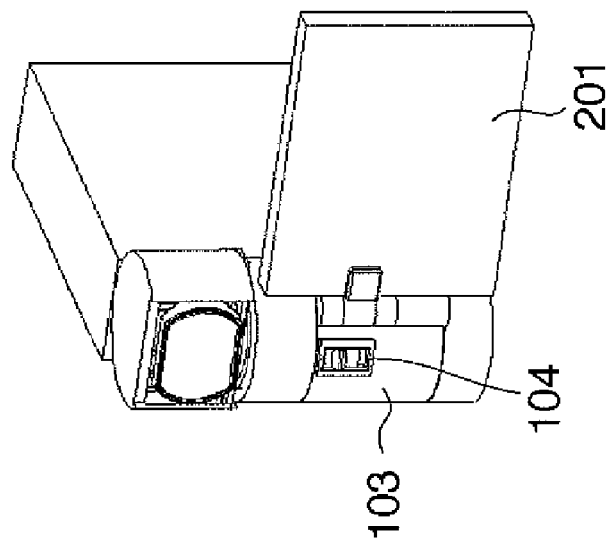
FIG. 12A is a perspective view showing a state where a display monitor is closed in the video camera of FIG. 1.
Figure 12B:
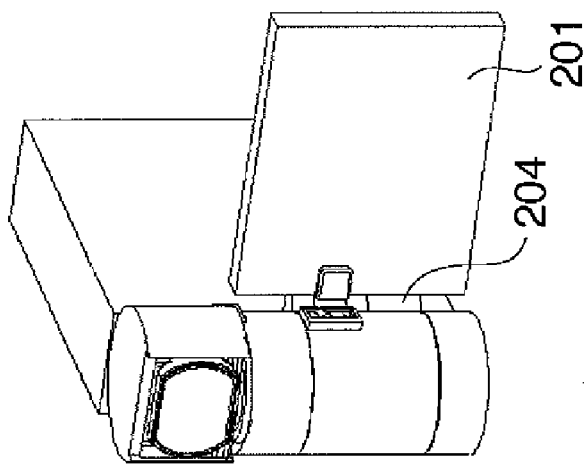
FIG. 12B is a perspective view showing a shooting style in which the display monitor is rotated around a rotating shaft of a pan hinge section to be turned to a direction of a shooter.
Figure 12C:
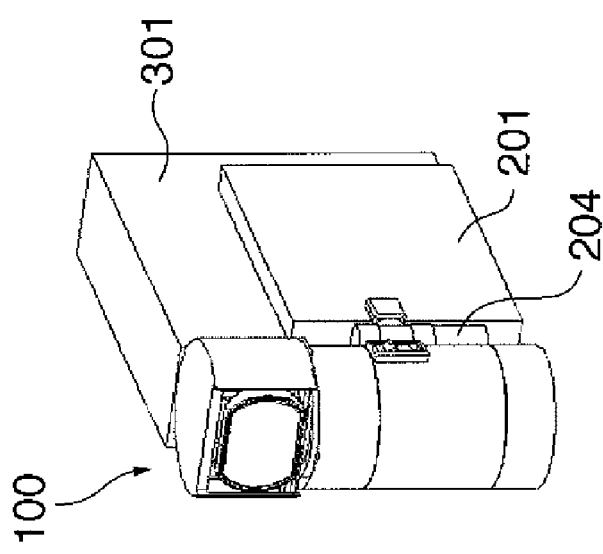
FIG. 12C is a perspective view showing a state where a display monitor drive barrel is rotated to a position at which the lens barrel is coupled to the display monitor.

Next, shooting styles of the video camera of this embodiment will be described with reference to FIGS. 12A to 12C and FIGS. 13A to 13C. FIG. 12A is a perspective view showing a state where the display monitor is closed in the video camera of FIG. 1. FIG. 12B is a perspective view showing a shooting style in which the display monitor is rotated around the rotating shaft of the pan hinge section to be turned to a direction of the shooter. FIG. 12C is a perspective view showing a state where the display monitor drive barrel is rotated to a position at which the lens barrel is coupled to the display monitor. FIG. 13A is a perspective view showing a state where the tilt hinge section 203 is angularly rotated by π (rad) to turn the display monitor toward the object, with respect to FIG. 12C. FIG. 13B is a perspective view showing a state where the lens barrel and the display monitor are panning driven in an interlocked manner, with respect to FIG. 13A. FIG. 13C is a perspective view showing a state where the lens barrel and the display monitor are further tilting driven in an interlocked manner, from the state shown in FIG. 13B.

In the case of shooting with the video camera of this embodiment, the shooting can be performed in various shooting styles. For example, as shown in FIG. 12A, the shooting can be performed in a state where the display monitor 201 is housed at the housing position of the camera body 301. Also, as shown in FIG. 12B, the shooting can be performed in a state where the shooter manually rotates the display monitor 201 around the rotating shaft of the pan hinge section 204 to turn its screen section to the direction of the shooter.

If the lens barrel 100 and the display monitor 201 are panning driven in an interlocked manner, as shown in FIG. 12C, the shooter angularly rotates the display monitor drive barrel 103 from the above described initial position (shown in FIG. 12B) by π/2 (rad) with respect to the lens barrel 100. Then, the engaging section 104a of the display monitor interlock SW 104 of the display monitor drive barrel 103 angularly rotated from the above described initial position by π/2 (rad) in the panning direction can be engaged with the notch 105c (FIG. 2) of the lens barrel 100. Then, when the display monitor interlock SW 104 is slid downward, the engaging section 104a of the display monitor interlock SW 104 and the above described notch 105c are engaged. In other words, the display monitor drive barrel 103 is coupled to the lens barrel 100. In a state where the display monitor drive barrel 103 has been coupled to the lens barrel 100, if the lens barrel 100 is panning driven in response to the movement of the object, the display monitor drive barrel 103 is interlocked with this to be rotated around the axis of the lens barrel 100. This turns the screen section of the display monitor 201 to an eye gaze direction of the shooter toward the object, so that the shot image (object image) displayed on the display monitor 201 can be more easily checked. In this way, the shooting can be performed in such a shooting style in which the lens barrel 100 and the display monitor 201 are panning driven in an interlocked manner.

Furthermore, in the case where the video camera is fixed on the tripod stand and the like to shoot the shooter himself as the object, the object tracking mode is set. Here, it is assumed that the display monitor 201 has been set to be interlocked with each of the panning drive and the tilting drive of the lens barrel 100. In the case of this shooting, as shown in FIG. 13A, the display monitor 201 is angularly rotated around the shaft of the tilt hinge section 203 by Π (rad) from the state shown in FIG. 12C, and a screen section 202 of the display monitor 201 is turned toward the object.

Here, if the shooter, that is, the object, moves in a horizontal direction for example, as shown in FIG. 13B, the lens barrel 100 is panning driven in response to the movement of the object. In an interlocked manner with this panning drive of the lens barrel 100, the display monitor 201 is panning driven in the state where its screen section faces the moving shooter. This enables the shooter to perform the shooting while checking the shot image of the shooter himself, even if the shooter, that is, the object, moves in the horizontal direction.

Moreover, if the shooter, that is, the object, moves in a vertical direction for example, as shown in FIG. 13C, the lens barrel 100 is tilting driven in response to the movement of the object. In an interlocked manner with this tilting drive of the lens barrel 100, the display monitor 201 is tilting driven in the state where its screen section faces the moving shooter. This enables the shooter to perform the shooting while checking the shot image of the shooter himself, even if the shooter, that is, the object, moves in the vertical direction.

In this way, although the shooting can be performed in the various shooting styles, the shooting styles with the video camera of this embodiment are not limited to the above described examples.

As described above, according to this embodiment, the panning and tilting operations of the display monitor 201 can be performed in an interlocked manner with the panning and tilting operations of the lens barrel 100 as appropriate, which enables to increase the degree of freedom in the shooting. In other words, by interlocking the display monitor 201, it is possible to obtain the degree of freedom higher than that in the shooting in the case of panning and tilting driving only the lens barrel 100.

For example, in the case where the video camera is fixed on the tripod stand and the like, the orientation of the display monitor can be constantly matched to the shooting direction of the lens barrel, which enables the shooter to perform the shooting while constantly checking a shooting state, even if the shooter himself becomes the object and performs the shooting in a wide range of angle of view.

Moreover, since the lens barrel 100 consists of a lens barrel having a bent optical device, an operation range is not expanded according to the panning or tilting operation of the lens barrel 100, and the degree of freedom with respect to installation and maintenance is not compromised.

In addition, although this embodiment has been described in the case of using the lens barrel having the bent optical system, a lens barrel having a conventional optical system may be used instead of the lens barrel having the bent optical system. However in this case, the entire elongated lens barrel has to be rotated around the panning axis or the tilting axis for the panning operation or the tilting operation. Therefore, the operation range of the lens barrel is expanded, which reduces the degree of freedom with respect to installation and maintenance in comparison to the lens barrel having the bent optical system.

Moreover, the mechanism for interlocking the lens barrel and the display monitor is not limited to the above described mechanism, and the lens barrel may not be completely coupled to the display monitor drive barrel so that they may be interlocked by a frictional force. Also, the panning and tilting operations of the display monitor may be interlocked with the panning and tilting operations of the lens barrel, by individually providing the drive motors for performing the panning operation and the tilting operation of the display monitor respectively, and controlling the rotation of these motors.

Moreover, the principle of the present invention is not limited to the video camera, and can be applied to a digital still camera and the like.

While the present invention has been described with reference to exemplary embodiments, it is to be understood that the invention is not limited to the disclosed embodiments. The scope of the following claims is to be accorded the broadest interpretation so as to encompass all such modifications and equivalent structures and functions.

This application claims the benefit of Japanese Patent Application No. 2006-089215, filed Mar. 28, 2006 which is hereby incorporated by reference herein in its entirety.

What is claimed is:

1. An image pickup device comprising:
    a lens barrel supported on a device body in a manner rotatable around at least a first axis;
    a display monitor having a screen section on which a shot image captured by said lens barrel is displayed;
    a lens barrel drive unit configured to rotate said lens barrel around at least said first axis; and
    an interlock unit configured to rotate said display monitor around said first axis, in an interlocked manner with the rotation of said lens barrel around said first axis by said lens barrel drive unit,
    wherein said interlock unit has a release unit configured to release the interlock with the rotation of said lens barrel.

2. An image pickup device according to claim 1, wherein:
    said interlock unit supports said display monitor in a manner in which orientation of said display monitor is changeable so that at least said screen section faces an object, and
    said interlock unit rotates said display monitor around said first axis, at the same phase with respect to the rotation of said lens barrel around said first axis by said lens barrel drive unit.

3. An image pickup device according to claim 1, wherein said interlock unit has a support section configured to support said display monitor in a manner in which orientation of said display monitor is changeable, and a rotation interlock mechanism configured to rotate said support section around said first axis in an interlocked manner with the rotation of said lens barrel.

4. An image pickup device comprising:
    a lens barrel supported on a device body in a manner rotatable around at least a first axis;
    a display monitor having a screen section on which a shot image captured by said lens barrel is displayed;
    a lens barrel drive unit configured to rotate said lens barrel around at least said first axis; and
    an interlock unit configured to rotate said display monitor around said first axis, in an interlocked manner with the rotation of said lens barrel around said first axis by said lens barrel drive unit,
    wherein said lens barrel is rotatable around a second axis which is orthogonal to said first axis, and
    wherein said lens barrel drive unit rotates said lens barrel around said first axis, and also rotates said lens barrel around said second axis independently of the rotation of said lens barrel around said first axis.

5. An image pickup device according to claim 4, wherein:
said interlock unit has a display monitor drive unit configured to rotate said display monitor around said second axis, and
said display monitor drive unit rotates said display monitor around said second axis in an interlocked manner with the rotation of said lens barrel around said second axis by said lens barrel drive unit.

6. An image pickup device according to claim 4, further comprising:
a motion detection unit configured to detect motion of an object,
wherein said lens barrel drive unit rotates said lens barrel around said first axis and around said second axis, respectively, based on a detection result by said motion detection unit.

7. An image pickup device comprising:
a lens barrel supported on a device body in a manner rotatable around at least a first axis;
a display monitor having a screen section on which a shot image captured by said lens barrel is displayed;
a lens barrel drive unit configured to rotate said lens barrel around at least said first axis;
an interlock unit configured to rotate said display monitor around said first axis, in an interlocked manner with the rotation of said lens barrel around said first axis by said lens barrel drive unit;
a motion detection unit configured to detect motion of an object,
wherein said lens barrel drive unit rotates said lens barrel around said first axis, based on a detection result by said motion detection unit.

8. An image pickup device comprising:
a lens barrel supported on a device body in a manner rotatable around at least a first axis;
a display monitor having a screen section on which a shot image captured by said lens barrel is displayed;
a lens barrel drive unit configured to rotate said lens barrel around at least said first axis; and
an interlock unit configured to rotate said display monitor around said first axis, in an interlocked manner with the rotation of said lens barrel around said first axis by said lens barrel drive unit,
wherein said lens barrel has a bent optical system.

9. An image pickup device according to claim 8, wherein said interlock unit has a release unit configured to release the interlock with the rotation of said lens barrel.

\* \* \* \* \*